United States Patent
Dicke

(10) Patent No.: US 7,037,059 B2
(45) Date of Patent: May 2, 2006

(54) SELF-TAPPING SCREW FOR COMPOSITE MATERIALS

(75) Inventor: Robert Dicke, Ennepetal (DE)

(73) Assignee: Altenloh, Brinck Co. GmbH & Co. KG, Ennepetal (GB)

( * ) Notice: Subject to any disclaimer, the term of this patent is extended or adjusted under 35 U.S.C. 154(b) by 38 days.

(21) Appl. No.: 10/752,294

(22) Filed: Jan. 6, 2004

(65) Prior Publication Data

US 2004/0141827 A1    Jul. 22, 2004

Related U.S. Application Data

(60) Provisional application No. 60/438,409, filed on Jan. 7, 2003, provisional application No. 60/462,819, filed on Apr. 14, 2003.

(51) Int. Cl.
*F16B 35/04* (2006.01)
(52) U.S. Cl. ..................................... 411/413; 411/399
(58) Field of Classification Search ............... 411/412, 411/413, 399, 387.2
See application file for complete search history.

(56) References Cited

U.S. PATENT DOCUMENTS

| | | | | |
|---|---|---|---|---|
| 4,018,132 A * | 4/1977 | Abe | ............................ | 411/413 |
| 4,653,244 A * | 3/1987 | Farrell | ...................... | 52/745.21 |
| 6,000,892 A * | 12/1999 | Takasaki | ....................... | 411/413 |
| 6,022,177 A * | 2/2000 | Hofer | .......................... | 411/412 |
| 6,074,149 A * | 6/2000 | Habermehl et al. | ......... | 411/442 |
| 6,616,391 B1 * | 9/2003 | Druschel | ................. | 411/387.2 |
| 6,666,638 B1 * | 12/2003 | Craven | ....................... | 411/413 |
| 2003/0026675 A1 * | 2/2003 | McGovern et al. | ......... | 411/412 |

FOREIGN PATENT DOCUMENTS

| | | |
|---|---|---|
| DE | 200 07 321 | 9/2001 |
| EP | 0 460 264 A1 | 12/1991 |
| GB | 2 169 051 | 7/1986 |
| WO | WO 99/15796 | 4/1999 |

* cited by examiner

*Primary Examiner*—Flemming Saether
(74) *Attorney, Agent, or Firm*—Brinks Hoffer Gilson & Lione

(57) ABSTRACT

In accordance with an embodiment of the invention the threads of the two thread sections have an opposite pitch. Further, chips are reduced in that the tip of the screw near the thread section has been configured as a multiple screw-thread, in particular a double screw-thread, where the pitch of the threads of the multiple screw-thread is greater than the pitch of the single screw-thread of the thread section near the head of the screw.

11 Claims, 3 Drawing Sheets

SELF-TAPPING SCREW FOR COMPOSITE MATERIALS

CROSS REFERENCE TO RELATED APPLICATIONS

This application claims the benefit of related provisional applications Ser. No. 60/438,409 filed Jan. 7, 2003 and Ser. No. 60/462,819 filed Apr. 14, 2003, all of which are commonly assigned.

BACKGROUND

1. Field of the Invention

The present invention concerns a self-tapping screw, especially for wood-plastic composite materials or the like, including a screw head, an adjacent screw shaft and a screw tip, where two threaded sections have been formed on the screw shaft, the two threaded sections being separated by a thread-free section, and where each of the threads of the two threaded sections has a different pitch.

2. Description of Related Art

The German patent to Gebrauchsmuster 200 07 321.4 discloses a screw of the kind described above. This design of a screw leads to the result, that when two adjacent fasteners are to be joined by means of screws, they can be screwed together without pre-drilling in such a manner that the absence of a gap between the two fasteners can be ensured and an initial tensioning force can be generated. For this purpose, the two threaded sections contain threads with different pitches, where the threaded section closest to the screw tip has a greater pitch than the other threaded section. Similar screws are also shown in GB-PS 2 169 051, WO 99/15796, and EP 0 460 264 A1.

When the known screws are threaded into wood-plastic-composite materials, it has been found that an increased production of chips occurs, while the chips are transported away from the upper threaded portion the chips are thrown up below the screw head.

SUMMARY

The present invention is based on the objective of improving the screw mentioned above in such a manner that the chips are largely prevented from exiting in the region of the upper thread section.

In accordance with an embodiment of the invention the threads of the two thread sections have an opposite pitch. Further, chips are reduced in that the tip of the screw near the thread section has been configured as a multiple screw-thread, in particular a double screw-thread, where the pitch of the threads is greater than the pitch of the single screw-thread of the thread section near the head of the screw. The counter-rotational thread sections avoid transporting the chips from the upper thread region of the bore, thereby excluding the possibility of generating chips below the screw head.

The formation of a relatively large pitch for the threads of the multiple screw-thread makes it possible that the pitch of the single screw-thread can be enlarged as well. A pitch ratio of 2:1 is advantageous as the overall resistance to starting the threaded engagement is reduced compared to known screws without a reduction of the achievable holding forces, because a reduction of the holding forces resulting from the greater pitch of the thread is essentially compensated for as a result of the multiple thread of the threaded section which is adjacent the tip of the screw.

Furthermore, the use of the single screw-thread with the reduced pitch as compared to the multiple screw-thread results in the advantage that the chips being generated are retained or pushed back into the screw hole. By virtue of the overall increase of the pitch in both threaded sections as compared to known screws, the production of chips as such is also reduced.

Furthermore, when the screw threads are first engaged, a different advance occurs as a result of the different pitch of the two threaded sections. As soon as both thread sections are engaged, so that the upper part is pulled against the lower part preventing a gap between the two parts and at the same time generating an initial tension force. It is also contemplated that the threaded section and the thread-free sections are dimensioned in such a way, that when the thread is fully engaged, the-section, which is free of threads, bridges the transition region between the two parts.

Advantageous embodiments of the invention are contained in the subordinate claims. The invention will be explained in more detail on the basis of the examples of the embodiments shown in the enclosed drawings.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The following is shown.

DETAILED DESCRIPTION

Figure 1:
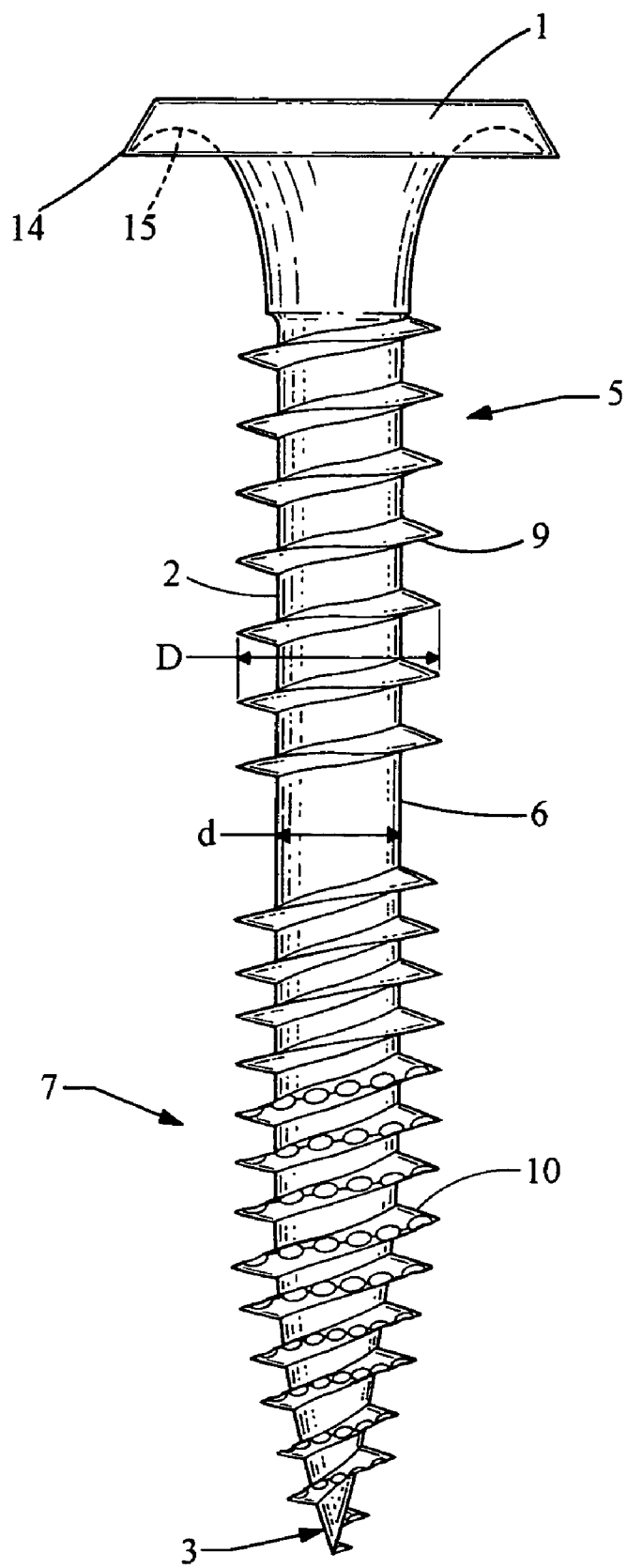
FIG. 1 a view of a self-tapping screw in accordance with the invention.

A screw in accordance with the invention, which is designed as a self-tapping screw or a self-drilling screw, comprising a screw head 1 and an adjacent screw shaft 2 with a screw tip 3. The screw head 1 is shown in the example of the embodiment as a flat head. The screw shaft 2 has a constant root diameter d, which becomes continuously smaller in the region of the screw tip 3, and which runs out at the end of the screw tip 3. On the screw shaft 2 there is a first threaded section 5 which is close to the screw head, and which in turn is followed by thread-free section 6, which is again followed by a second screw tip near the threaded section 7, the thread of which runs out at the screw tip 3. The threaded section 5 has a thread 9, which is designed as a single thread. A thread 10 on the threaded section 7 is designed as a multiple thread, shown in FIG. 1 as a double thread, with two parallel threads. The pitch of the threads of the double thread is greater than the pitch of the thread of the single-thread of the threaded section 5. The pitch ratio is preferably 2:1. Thus, the advance in the threaded section 7 with its greater pitch is greater than the advance in the threaded section 5 with its smaller pitch.

In the example of the embodiment shown, the threads 9, 10 of the two threaded sections 5, 7 have the same outer thread diameter D. However, it would also be within the scope of the invention, if these two threaded sections would have a different outer thread diameter, in such a case the outer thread diameter of the thread 9 would be greater than the outer thread diameter of the thread 10. Further, the root diameter d of the two threaded sections 5, 7 is also dimensioned independently. In the example of the embodiment shown, the thread 10 continues on the tip of the screw up to its end point. But it is also within the scope of the invention, if the screw point 3 is designed as a drill tip or a friction tip. By means of having a smaller pitch thread on the threaded section 5, it is further achieved that the chips are held back or pushed back into the drilled hole. By virtue of the fact that the thread of the threaded section 5 has a relatively large pitch, an overall reduced resistance to an initial thread engagement is achieved. In addition, the multiple thread or a double thread configuration still ensures a strong holding force. The screw head 1 has on its underside a circumferential edge 14, which protrudes with respect to its lower head surface 15. By means of this edge 14, any protruding material chips are cut through while the screw is advanced. By virtue of fact that the lower head surface 15 is curved slightly toward the inside, an additional space for receiving the chips is generated.

Figure 2:
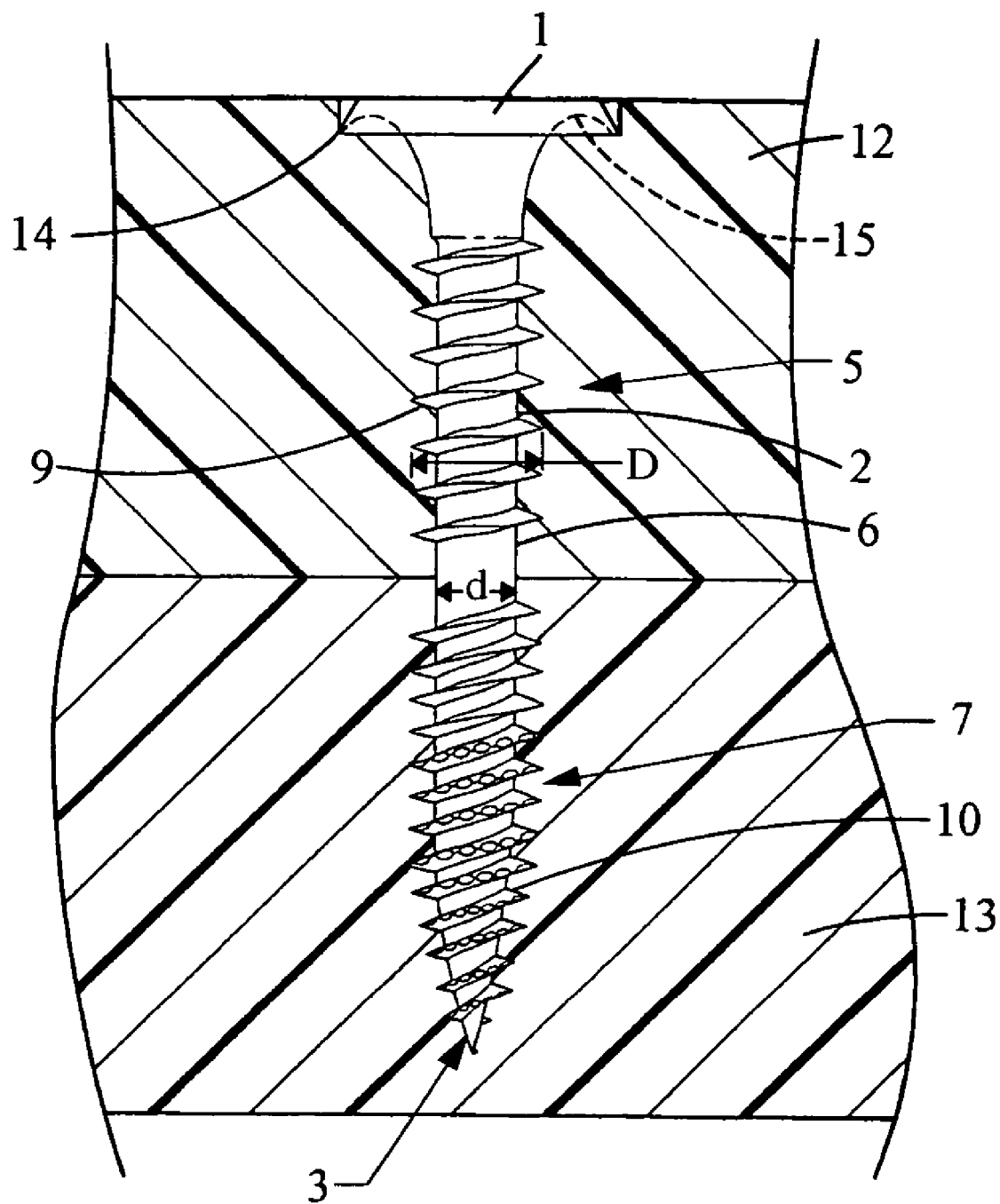
FIG. 2 a section through a connection of two fasteners by means of a screw in accordance with the invention according to FIG. 1, FIG. 3 a view of a second embodiment of a self-tapping screw in accordance with the invention and FIG. 4 a plan view of a screw head of the screw in accordance with the invention according to FIG. 3.

As can be seen from FIG. 2, where a connection by means of a screw in accordance with the invention, the thread-free section 6 bridges the contact area of the two parts 12 and 13. It may be advantageous if these two parts 12, 13 are composite parts made of a wood-plastic mixture. As shown in FIG. 2, it is preferred that the thread section 5 runs exclusively in the front part 12, and that the thread section 7 runs preferably exclusively in the part 13, when fully advanced. By virtue of this design, it is then ensured that, when the screw according to the invention is fully advanced, the two parts 12, 13 are in contact with each other free of gaps and under an initial tension force. The magnitude of the initial tension force is determined by the pitch difference and the advance difference associated with it, when the screw in accordance with the invention is screwed into the two parts 12, 13. For the screw in accordance with the invention a pre-drilling of the fasteners is not required.

Figure 3:
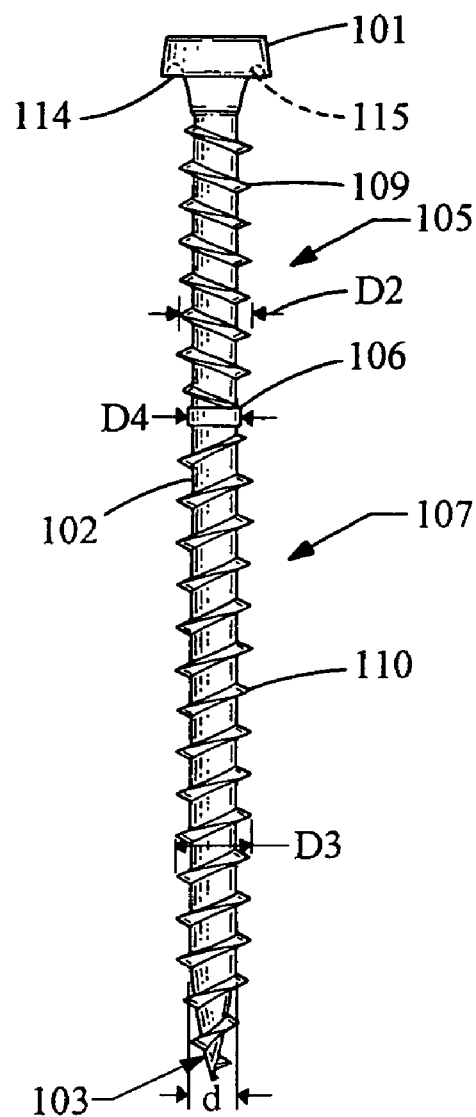

A further embodiment of the screw according to the invention, see FIG. 3, which has been designed as a self-tapping or self-drilling screw, consists of a screw head 101 and screw shaft 102 adjacent to it with a screw tip 103. The screw head 101 in the embodiment shown according to FIG. 3 is fashioned as a flat-head. The screw shaft 102 has a constant root diameter d, which is progressively reduced in the region of the screw tip 103 and runs out at the end of the screw tip 103. On the screw shaft 102 a first thread section 105 is formed near the screw head, which is followed by a thread-free section 106, which in turn is followed by a second thread section 107 near the screw tip, the thread of which thread section 107 runs out at the screw tip 103. The thread section 105 has a thread 109, which is formed as a single-thread screw. A thread 110 on the thread section 107 has a pitch opposite to that of thread 109. The thread 110 is, in its preferred embodiment, fashioned as a single thread, but it can also be designed as a multiple thread, for example a double thread. The pitch angles of the two threads 109, 110 are shown as having equal magnitude, but they can also be of different sizes.

This embodiment of the invention includes two oppositely threaded sections 105, 107. The oppositely threaded sections prevent the chips from being transported out of the upper thread region when the screw is threaded into parts to be joined. Rather, the chips remain in the region of the thread section 105 near the screw head or are transported advantageously in the direction of the thread section 107 near the screw tips thereby prohibiting the accumulation of chips below the screw head.

In the embodiment of the invention shown in FIG. 3, the threads 109, 110 of the two thread sections 105, 107 have different outer thread diameters D2, D3. The outer thread diameter D2 of the thread section 105 near the screw head is smaller than the outer thread diameter D3 of the thread section 107 near the screw tip. Preferably the outer thread diameter D2 is 5.3 mm, while the outer thread diameter D3 preferably amounts to 5.5 mm.

The thread-free section 108 has, in the examples of embodiments described, a diameter D4, which is larger than the root diameter d of the respective thread sections 105, 107.

The height of the thread between two threads of the thread section 105 near the screw head is smaller than the height of the thread between two threads of the thread section 107 near the screw tips. The thread height between two threads of the thread near the screw head is preferably 2.5 mm, while the thread height between threads of the thread section 107 near the screw tip is preferably 2.8 mm.

In the example of the preferred embodiment according to FIG. 3, the screw head 101 has on its underside a circumferential edge 114, which protrudes with respect to the surface 115 beneath its head. The edge 114 severs protruding material chips while the screw is advanced. By virtue of the fact that the surface 115 underneath the head is curved slightly toward the inside, an additional space for receiving the chips is generated.

In the example of the preferred embodiment shown in FIG. 3, the length of the thread section 107 near the screw tips is about 2 to 3 times greater than that of the thread section 105 near the screw head. The length of the thread section 107 near the screw tips is preferably 2.6 to 2.7 times greater than that of the thread section 105 near the screw head.

The screw head 101 is up to 2 to 3 mm high. It is, in particular, 2.6 mm high. The screw head diameter at the end near the threaded shaft is larger than the diameter at the opposite end, while the screw head diameter at the end near the threaded shaft is, in particular, 8.1 mm, and the diameter at the opposite end has a size of about 7.7 mm.

Figure 4:
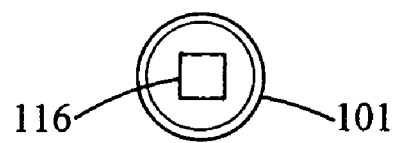

The screw head 101 includes a recess 116 (FIG. 4) for a turning tool for turning the screw into the parts to be joined. The recess 116 is preferably formed as an interior square. But it is also within the scope of the invention that the screw head be equipped with a recess, which can serve for accepting a common turning tool, where the turning tool may be fashioned as a screw driver for slotted-head screws or even as a hex-head screw driver. The screw head in accordance with FIG. 1 can, of course, have this configuration.

When the screw is screwed in, the configuration of the individual threaded sections is such that the thread section 105 is located preferably exclusively in the forward part to be joined as viewed in the direction in which the screw advances, and the screw section 107 is located preferably exclusively in the rearward part to be joined when viewed in the direction in which the screw advances. Pre-drilling of the parts to be joined is not required in the case of the screw according to the invention.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A self-tapping screw comprising:
   a screw head;
   a screw shaft adjacent to the screw head;
   a screw tip; and
   wherein a first and second thread sections have been formed on the screw shaft and are separated by a thread-free section, and the threads of the first and second thread sections having an opposite pitch, and wherein an outer thread diameter of the first thread section near the screw head is smaller than an outer thread diameter of the second thread section near the screw tip and where the first and second thread sections have the same root diameter.

2. Self-tapping screw according to claim 1, characterized in that a pitch angle of the first and second thread sections is of equal size.

3. Self-tapping screw according to claim 1, characterized in that a pitch angle of the first and second thread sections is of a different size.

4. Self-tapping screw according to claim 1, characterized in that a thread height between the threads of the first thread section near the screw head is smaller than a thread height between threads of the second thread section near the screw tips.

5. Self-tapping screw according to claim 1, characterized in that the length of the first thread section close to the screw tip is about 2.0 to 3.0 times larger than the second thread section near the screw head.

6. Self-tapping screw according to claim 1, characterized in that the screw head is 2 to 3 mm high.

7. Self-tapping screw according to claim 1, characterized in that the thread-free section has a larger diameter than a root diameter of the first and second thread sections.

8. Self-tapping screw according to claim 1, characterized in that the threads of the second thread section on the screw tip continue to its end.

9. Self-tapping screw according to claim 1, characterized in that the screw head has a circumferential edge on a underside of the screw head, which edge protrudes relative to a surface on the underside of the head.

10. Self-tapping screw according to claim 1, characterized in that the screw head diameter is greater at a end near the thread shaft than a diameter at an opposite end.

11. Self-tapping screw according to claim 1, characterized in that the screw head contains a recess for a turning tool.

* * * * *